Dec. 14, 1965 J. ERNE 3,223,132
TEMPLATE FOR MAKING TENON JOINTS
Filed June 2, 1961 2 Sheets-Sheet 1
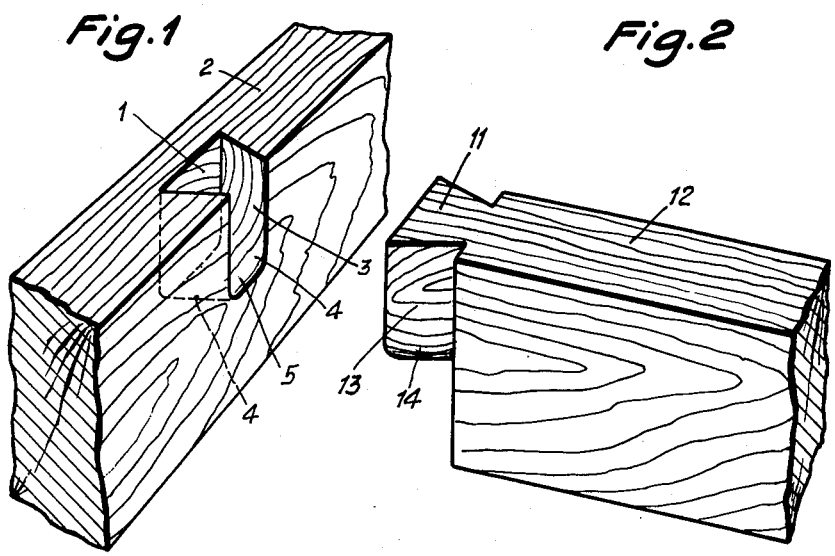
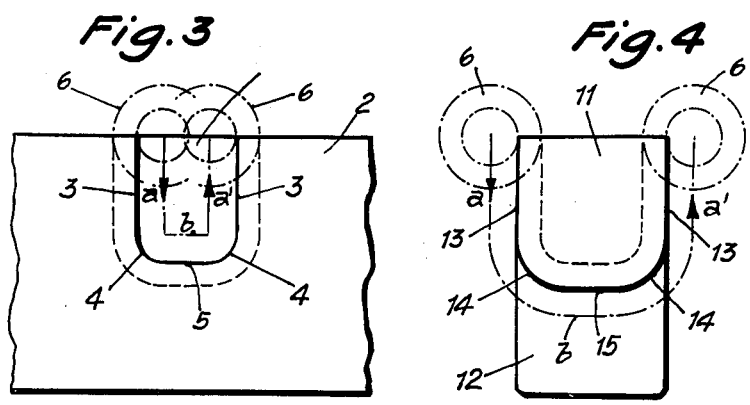
INVENTOR
Josef Erne
BY Lowry & Rivelart
ATTORNEYS

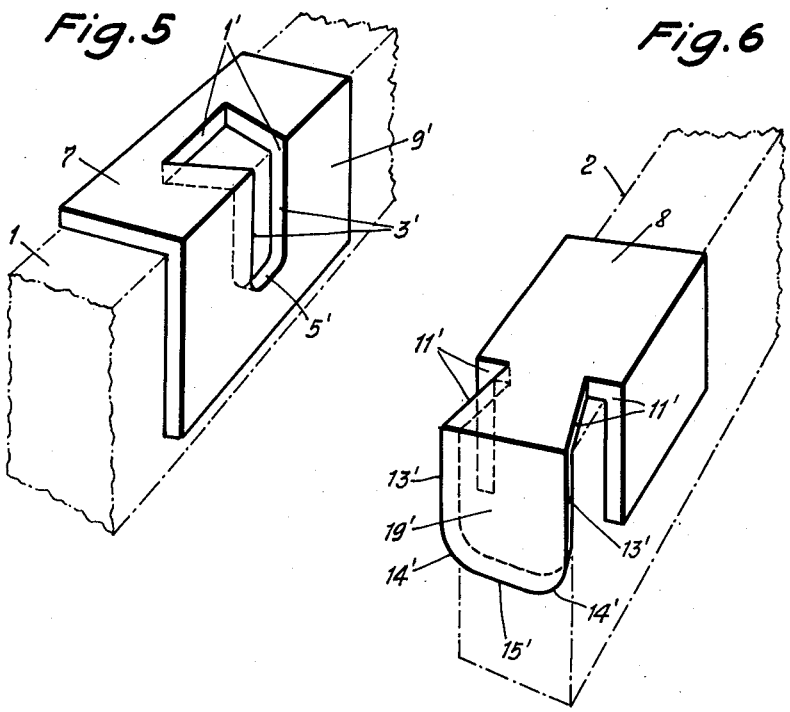
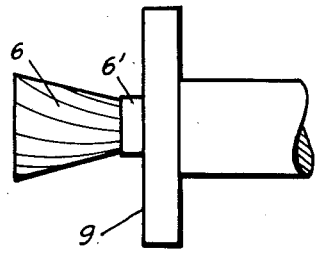

United States Patent Office 3,223,132
Patented Dec. 14, 1965

3,223,132
TEMPLATE FOR MAKING TENON JOINTS
Josef Erne, Laufenburg, Switzerland
Filed June 2, 1961, Ser. No. 114,371
Claims priority, application Switzerland, June 3, 1960, 6,428/60
1 Claim. (Cl. 144—87)

My present invention relates to improvements in dovetail joints for wooden beams.

The manufacture of dovetail joints for wooden beams is a time-consuming operation done manually with the aid of mortising tools. The tenons and grooves of such joints have been executed so far with sharp edges and corners.

The primary object of my invention is the provision of a dovetail joint for wooden beams which may be made considerably quicker and more exact than heretofore. Such object is attained by making the tenons of one member and the corresponding mortise of the other member to present arcuate transitions on the contour faces, by eliminating sharp edges and corners. The dovetail joint disclosed in the following specification is made by working out the tenons of one structural member and the similar mortise of the other member by means of a rotary cutter of which the diameter increases towards its free end and of stop and guide means on a template set on the workpiece.

One form of the dovetail joint and of the means for carrying out same are shown in the drawing, in which:

FIG. 1 is a view of the wooden beam provided with a mortise,

FIG. 2 is a view of the wooden beam provided with the analogous tenon,

FIG. 3 is a schematical side view towards the mortise, the arrows indicating the U-shaped track of the cutter in the milling operation, FIG. 4 depicts schematically an end view towards the tenon, the arrows here also indicating the U-shaped cutter track, FIG. 5 is a view of the template for making the mortise, FIG. 6 illustrates the template for making the tenon, and FIG. 7 is a side view of the cutter used.

The dovetail joint shown suitably is machined either in the shop or on the building site. In the latter case is used a mobile cutting device. While the invention herein disclosed is primarily directed to the form of a male template, the mortise and template therefor will be described for the production of a complete mortise and tenon joint. As shown in FIG. 1, the mortise 1 is cut-in on a long side of the wooden beam 2 vertically from above, approximately down to half its thickness. The cutter hereby is executing a downward rotary motion about the horizontal axis, then a horizontal motion which determines the width of the mortise, and subsequently an upward return movement. As the cutter 6, as shown in FIG. 7, has a conically tapered milling head, the mortise is given the well known dovetail form, but the contour faces do not present any sharp edges or corners. Rounded transition faces 4 of the lateral limiting faces 3 form a seat 5 on the mortise bottom, and the depth of mortise 1 is defined by the length of the cutter head. The length or height of the mortise, on the other hand, is defined by the vertical movement $a$ or $a'$ of cutter 6 which rotates with horizontal axis, and the width or breadth of the mortise is determined by the horizontal cutter movement $b$. The same cutter 6 also is used for making the tenon 11 in the other wooden beam 12, so that the tenon also is given a corresponding dovetail profile. The lateral limiting faces of tenon 11 are rounded below at 14 and join to form a horizontal bearing face 15 as shown in FIG. 4.

To obtain the proper fit of tenon and mortise, the tenon and mortise are made with the aid of one and the same cutter 6 (FIG. 7) as well as with the aid of two templates 7 and 8 (FIGS. 5 and 6).

Template 7 for making mortise 1 is of angular profile and may be abutted against the long side of beam 2 on which it is fixable by means not shown. The template comprises a cutout 1' of which the horizontal leg approximately corresponds to the profile of dovetail mortise 1 but is of such size that the milling head does not contact the rim of template opening 1'. The lateral edges 3' of opening 1' serve as guide curves for cutter 6 which by its guide collar 6' (FIG. 7) is guidable along said curves. Cutter 6 further comprises a guide flange 9 which allows to obtain a good abutment of the cutter against the vertical template front leg 9'. When making the mortise, cutter 6 is guided along the guiding edges 3', 5' of the guide cut-out on the vertical template leg. First, cutter head 6 is moved vertically downwards over a distance $a$ on one guide edge 3', and finally vertically upwards over a distance $a'$ on the other guide edge 3'. The cutting movement is executed with the beam in the case of a stationary milling machine and, for example on the building site, it is executed with the milling unit.

The male template disclosed herein comprises a first plate 8 with a lateral guide leg 8a at each side thereof to form a U-shaped frame as shown in FIG. 6 for placement on a beam 2 with the side legs having a snug contact with the opposite sides of the beam. A second plate 8b extends from one end of the first plate 8 in the plane thereof and is of trapezoidal shape with the wider side remote from the first plate. The cut-outs 11' form the trapezoidal shape of the second plate and the outer end of the second plate carries a depending third plate 19' at right angles thereto and of the same width as the wider outer end of the trapezoidal plate 8b for contact with the adjacent end of the beam 2. The depending third plate 19' has marginal edges upon the sides and bottom thereof that consistute guides for the milling cutter 6.

Side cut-outs 11' form the second plate in trapezoidal shape and the guide edges 13', 14' and 15' of the third plate 19' constitute an abutment for the guide flange 9 of the cutter 6.

The templates may, of course, be shaped differently than shown. Of essence is, however, that the male template affords good abutment on the beam and a guide means for the cutter on which the latter is movable in a U-shaped track while held parallel to itself.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claim.

Having thus described my invention, I claim as new and desire to secure by Letters Patent:

A male guide template for the producing a tenon for association with a mortise of complemental configuration, by means of an angle groove milling cutter which at the head of its shaft is provided with a depth limitation flange and a cylindrical guide part forming the transition to the milling head, said template being composed of a first plate with a lateral guide leg at each side forming a U-shaped frame for placement on a beam with the distance between the guide legs corresponding to the width of the beam on which the tenon is to be formed, a second plate coextensive with the first plate and being cut away at opposite sides to trapezoidal shape with the shorter side at the forward end of the first plate and centrally thereof and a third plate depending from the wider outer end of the second plate at right angles thereto and the same width as the wide end of said second plate and overlying and contacting the end of the beam on which the template is placed and having merging marginal edges upon the sides and bottom thereof constituting guides for the milling cutter.

References Cited by the Examiner

UNITED STATES PATENTS

| | | | |
|---|---|---|---|
| 99,446 | 2/1870 | Jordan | 144—87 |
| 850,889 | 4/1907 | Kelly | 90—92 |
| 890,743 | 6/1908 | Winberg | 144—87 |
| 1,067,910 | 7/1913 | Florey | 20—92 |
| 1,651,510 | 12/1927 | Carter | 144—87 |
| 1,736,709 | 11/1929 | Flagg | 144—27 |
| 2,614,302 | 10/1952 | Johnson. | |
| 2,733,518 | 2/1956 | Pszegon | 144—27 |

FOREIGN PATENTS

| | | |
|---|---|---|
| 937,615 | 1/1956 | Germany. |
| 279,173 | 10/1927 | Great Britain. |
| 540,956 | 11/1941 | Great Britain. |

ROBERT C. RIORDON, *Primary Examiner.*

JACOB L. NACKENOFF, WILLIAM W. DYER, LESTER M. SWINGLE, *Examiners.*